March 27, 1962 W. R. KNOWLTON ETAL 3,026,771
MULTI-POSITION REAR VISION MIRROR
Filed July 7, 1958
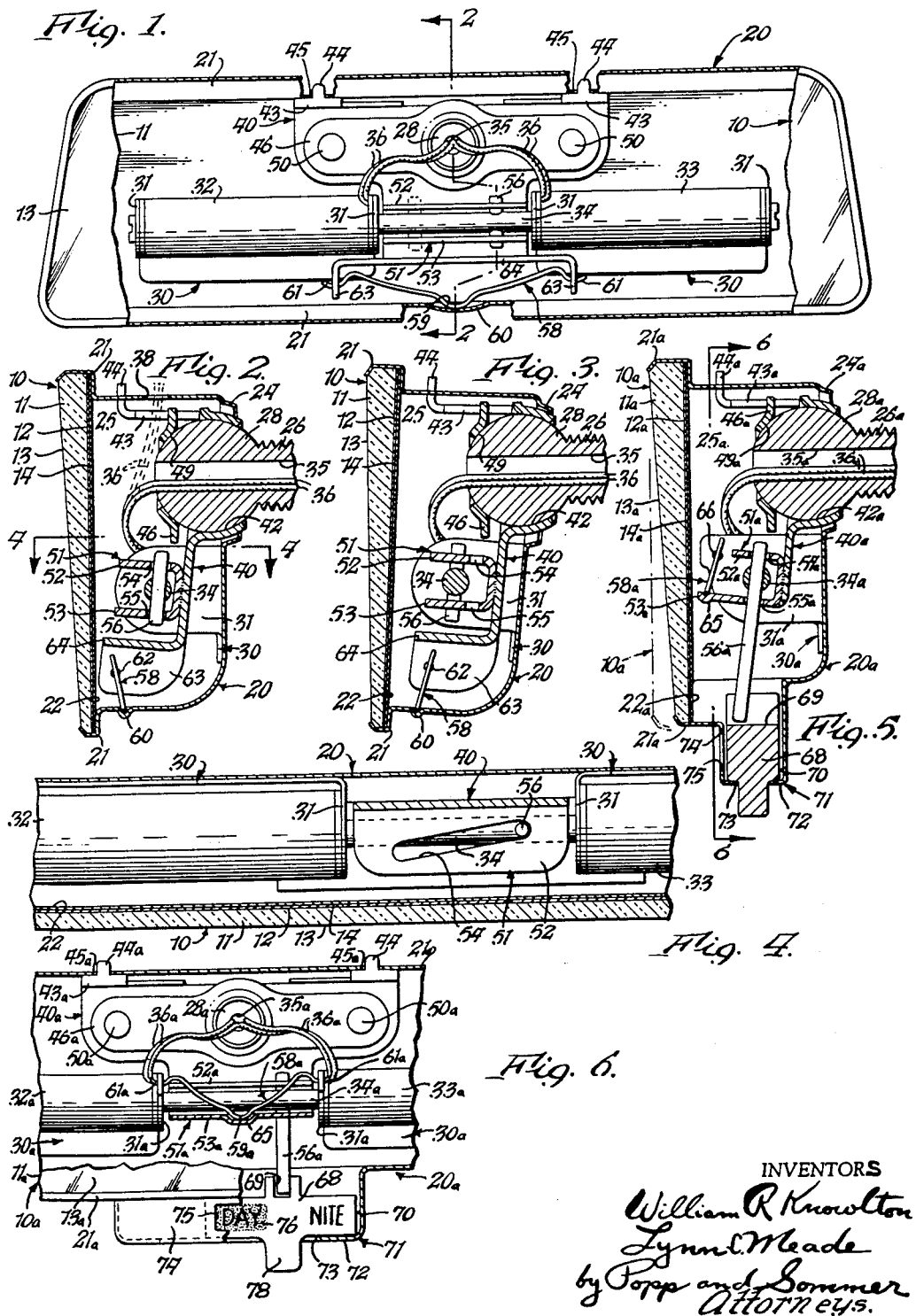
INVENTORS
William R Knowlton
Lynn E Meade
by Popp and Sommer
Attorneys

United States Patent Office 3,026,771
Patented Mar. 27, 1962

3,026,771
MULTI-POSITION REAR VISION MIRROR
William R. Knowlton, Williamsville, and Lynn C. Meade, Buffalo, N.Y., assignors to Standard Mirror Company, Inc., Buffalo, N.Y., a corporation of New York
Filed July 7, 1958, Ser. No. 746,842
1 Claim. (Cl. 88—77)

This invention relates to a multi-position mounting for a rear vision mirror and is more particularly shown as a mounting for a glare reducing rear vision mirror adapted for both day and night traveling wherein the brightness of reflected images or light from headlights or sun can be reduced selectively to the desired intensity. However, the invention can also be embodied in a mounting for an ordinary rear vision mirror panel where the multi-position adjustment is operative to move the mirror panel from an operative to an inoperative position in avoiding glare.

The invention is particularly shown in conjunction with a mounting for a single prismoidal mirror panel as shown in the La Hodny and Bertell Patent No. 2,325,615 granted August 3, 1943, for Mounting for Rear Vision Mirrors where a high intensity image is reflected from the metallic reflective coating on the back of the prismoidal glass panel and the low intensity image is reflected from the front face of the prismoidal glass panel. It is also possible to employ two glass panels arranged at an angle to each other and one of which is provided with a reflective coating as shown in the Bertell and Meade Patent 2,640,394 granted June 2, 1953, for Rear Vision Mirror. It is also possible to employ images of intermediate intensity by selecting, as disclosed in the Sherts Patent 2,455,818 granted December 7, 1948, for Glare Reducing Rear-Vision Mirror, images which have been subjected to different numbers of cross reflections between the primary mirror and a secondary transparent plate. It is also possible to employ the mounting for an ordinary mirror panel in which case in one position the mirror panel is operative and in another position the view through the rear window of the automobile is out of the driver's line of sight so that a glaring reflection can be avoided.

One of the principal objects of the present invention is to provide such a multi-position rear vision mirror which is operated electrically and can be controlled from a switch at a remote place so that the rear vision mirror can be adjusted with great ease and so that it can be arranged externally of the automobile body or at any other place and at the same time readily adjusted.

Another object is to provide such a rear vision mirror which can also be actuated manually.

Another object of the invention is to provide such a rear vision mirror in which the electrical and other components are so arranged as to provide a mirror which is compact and can be made of pleasing design.

Another object is to provide such a mounting which is free from vibration and is also free from loss of proper position due to the vibration of the automobile in which it is mounted.

Another object of the invention is to provide such a rear vision mirror which can be readily adjusted about a ball joint to suit the position and height of the driver without interfering with the adjustment of the mirror panel as to its intensity of reflection.

Another object is to provide such a rear vision mirror mounting which is extremely simple and rugged in construction and also low in cost.

Other objects and advantages of the invention will be apparent from the following description and drawings in which:

FIG. 1 is a vertical elevational view, with parts broken away, of a rear vision mirror panel supported by a multi-position mounting embodying the present invention.

FIG. 2 is a vertical sectional view taken generally on line 2—2, FIG. 1 and showing the position of the parts for reflecting a high intensity image such position being used for normal daytime traveling where the maximum reflectivity is ordinarily desirable.

FIG. 3 is a view similar to FIG. 2 showing the position of the parts for reflecting a low intensity image, this position of the parts being used at night to reduce the glare of headlights from following vehicles and also being capable of use at sunset and sunrise to avoid an intense direct reflection of the sunlight into the eyes of the driver.

FIG. 4 is a fragmentary horizontal section taken generally on line 4—4, FIG. 2.

FIG. 5 is a view similar to FIG. 2 and showing a modified form of the invention.

FIG. 6 is a view similar to FIG. 1 but taken generally on line 6—6, FIG. 5 to illustrate the modified form of the invention illustrated in FIG. 5.

Referring particularly to the form of the invention shown in FIGS. 1–4 the invention is shown as embodied in a mounting for a prismoidal glass mirror panel which is indicated generally at 10, although it will be understood that the mounting can also be used to support an ordinary flat mirror panel in which case the multi-position adjustable support as hereinafter described is merely used to move the mirror panel from an operative to an inoperative position and vice versa. The prismoidal mirror panel 10 is shown as made of a horizontally elongated plate of glass 11 which is ground so that the vertical axis of its rear planar face 12 is set at an angle to the vertical axis of its front planar face 13 but the horizontal axes of these faces are parallel. The mirror panel 10 is thereby wedge-shaped in vertical section and is arranged with its thicker part at its upper end, although this is optional. The glass plate 11 is provided on its rear face with a coating 14 of reflective material, this coating being preferably of a highly reflective metal such as silver in view of the fact that a dulled reflection is obtained through using the secondary image reflected by the front face 13 of the glass panel 11. This glass panel 11 is shown as having a straight bottom, rounded, upwardly converging end edges, and a straight top to provide a mirror of pleasing shape.

The mirror panel 10 is encased in a metal backing shell or case 20, the edges 21 of which conform to the edges of the mirror panel 10 and these edges 21 being flanged or bent around the rim of the mirror panel 10 to provide a bezel, this bezel holding the mirror panel 10 against forward or rearward displacement with reference to its case 20. The silvered mirror panel 10 is also preferably backed by a paper protecting sheet 22.

The bezel 21 of the case or shell 20 thereby conforms to the outline of the mirror panel 10. Along its vertical center line, but substantially closer to its top than to its bottom, the back of this case is provided with an opening the rim of which is rearwardly flanged as indicated at 24. The shell or case 20 is cup-shaped so as to dish rearwardly from its rim 21 and form a chamber 25 between the mirror plate 10 and the back of the shell 20. The entire mechanism for adjusting the mirror panel 10 to different degrees of reflectivity, as well as to manually aim and level the mirror panel to suit the height and position of the driver is substantially entirely contained within this chamber 25 and hence is substantially entirely concealed.

The stem 26 of a ball 28 extends through the opening surrounded by the rim 24, this ball preferably being integral with the stem and disposed within the chamber 25 provided by the metal case or shell 20 and the mirror panel 10. The opposite end of the stem 26 can be secured to the automobile by any suitable mounting (not shown).

The shell or case 20 is preferably made of very light gage sheet metal both to reduce the weight and cost of the rear vision mirror assembly and also to facilitate forming the rim 21 around the rim of the mirror panel 10 to form a bezel for this mirror panel. However, it can also be made of plastic or in the form of a die casting. Within the chamber 25 a pair of sheet metal brackets 30 are arranged in horizontal alinement with each other. Each of these brackets is of U-shaped form having its elongated back welded to the inner face of the case 20 and having end ears 31 which project toward the mirror panel 10. These ears are in horizontal alinement with one another and the brackets are arranged in the lower part of the chamber 25. The ears of each bracket 30 support the opposite ends of a solenoid, the solenoids being designated at 32 and 33. These solenoids 32, 33 are in horizontal alinement with each other and have a common axially movable core in the form of a rod 34. This core or rod 34 is moved toward the energized solenoid and operates to adjust the position of the mirror panel 10 as hereinafter described. The wires 36 from the two solenoids 32, 33 can pass through a bore 35 provided in the ball and stem 28, 26 or these wires 36 can emerge from the case 20 through an opening 38 in one side thereof, as illustrated in FIG. 2 and in which a dotted line representation is made illustrating the manner in which the solenoid wires 36 can pass through this hole 38 instead of the bore 35.

The numeral 40 represents a rear ball engaging plate which is housed in the chamber 25 and is provided with an opening the rim of which is flanged rearwardly or toward the back of the metal case or shell 20 so as to provide a spherical seat 42 engaging the stem side of the ball 28. The opposite ends of the upper edge of this ball engaging plate 40 are extended to provide arms 43 which project toward the top of the mirror panel 10 and have upwardly projecting fulcrum ears 44 at their outboard extremities which project through fulcrum holes 45 provided in the top wall of the case 20 and about which fulcrum ears 44 the mirror panel 10 and case 20 pivot to provide the different positions of reflectivity.

The ball seat 42 is held in frictional engagement with the stem side of the ball 28 by a front ball engaging spring plate 46. This spring plate is shown as being of horizontally elongated form and as having a central opening the rim of which is flanged forwardly toward the mirror panel 10 so as to provide a seat 49 for that face of the ball 28 which faces the mirror panel 10. The horizontal ends of the spring plate 46 are secured to the rear ball engaging plate 40 by rivets 50 or in any other suitable manner.

The mechanism for adjusting the mirror panel 10 to its two positions of intensity of reflection is completed by a U-haped bracket 51 which has its cross part suitably welded to the rear ball engaging plate 40 and has upper and lower horizontal flanges 52 and 53 arranged to embrace the common core 34 of the two solenoids, the flange 52 being arranged above this core and the flange 53 being arranged below this core. These flanges are formed to provide cam slots 54, 55, respectively, which are arranged in vertical alinement with each other and which slots are inclined horizontally with reference to the core 34. This core is provided at its center with a vertical cross pin 56, the ends of which ride in the cam slots 54, 55. It will be seen that when one of the solenoids 32, 33 is energized the core 34 is moved in the corresponding direction thereby to move the cross pin 56 along the cam slots 54, 55 and to tilt the mirror 10 and its case 20 about the axis provided by the fulcrum ears 44. Energizing the other solenoid returns the parts to the original position.

It is important that the parts be yieldingly held in each of these two positions of reflectivity and for this purpose a spring 58 is provided. This spring is shown as being in the form of a single piece of wire having a central downwardly offset fulcrum portion 59 which fits in a small socket 60 struck from the bottom of the case or shell 20 and having two arms which project toward opposite ends of the mirror. The ends 61 of each of these arms are of hooked form and project through holes 62 provided in spaced ears 63 formed integrally with a forward extension 64 of the bottom of the rear ball plate 40. The hole 62 and socket 60 are so positioned that the spring 58 swings beyond dead center when the solenoids are actuated to move the parts from one position of image intensity adjustment to the opposite position and vice versa.

In the operation of the form of the invention shown in FIGS. 1–4, assuming the parts to be in the position of high intensity reflection shown in FIGS. 1 and 2, the operator, by closing a suitable switch (not shown) energizes the solenoid 32. This draws the common core 34 to the left as viewed in FIGS. 1 and 4 thereby to move the cross pin 56 to the left hand end of the cam slots 54, 55 as shown in FIG. 4. Since the axis of the core 34 is held in fixed relation to the case 20 (through the mounting brackets 30 for the solenoids 32, 33) this movement of the pin 56 along the cam slots 54, 55 operates to swing the movable core 34, solenoids 32, 33, metal case 20 and mirror panel 10 about the fulcrum axis provided by the ears 44 from the position shown in FIG. 2 to the position shown in FIG. 3. In this position the face 13 of the mirror panel is more nearly vertical and the length of the cam slots 54, 55 is selected so that in this more nearly vertical position the image through the rear window of the automobile to the eyes of the driver is from the front surface 13 of the mirror and hence is of reduced intensity. In this movement of the parts the spring 58 swings from the position shown in FIG. 2 beyond dead center to the position shown in FIG. 3 so that this spring yieldingly holds the parts in this newly adjusted position and biases the parts against vibration or rattling.

When the driver desires to restore the mirror to its position of high intensity image reflection he energizes the solenoid 33. This draws the common core 34 to the right as viewed in FIGS. 1 and 4 thereby to draw the cross pin 56 along the cam slots 54, 55 to the right hand position illustrated in FIG. 4. This swings the mirror case 20, through the solenoids 32, 33 and their brackets 30, together with the mirror panel 10 from the position shown in FIG. 3 to the position shown in FIG. 2 thereby to restore the parts to the original position.

The form of the invention shown in FIGS. 5 and 6 includes the additional feature of a visual indicator, with or without tactile indicator, as to whether the rear vision mirror stands adjusted to its condition of high or low reflectivity, and provision is also made for manually adjusting the mirror in addition to the provision for electrically adjusting the mirror. The mirror panel 10a, metal case 20a, with its rim forming the bezel 21a for the mirror panel 10a, the ball 28a, stem 26a, rear ball engaging plate 40a with its upwardly projecting fulcrum ears 44a, front ball engaging spring plate 46a, brackets 30a carrying the solenoids 32a, 33a, common core 34a and vertical cross pin 56a riding in cam grooves 54a, 55a in the U-shaped bracket 51a welded to the rear ball engaging plate 40a are of substantially the same construction and operation as with the preferred form of the invention and the same reference numerals have therefore been applied and distinguished by the suffix "a."

It will be noted, however, that the wire spring 58a has been moved upwardly to the center of the mirror with its lower central fulcrum offset 59a being contained within a socket 65 in an extension, toward the mirror panel 10a of the lower flange or leg 53a of the bracket 51a. The hooked ends 61a of the wire spring 58a are contained in holes 66 provided in forward extensions of the center ears 31a of the brackets 30a for the two solenoids 32a, 33a. The spring 58a operates in the same manner as the spring 58 shown in the preferred form of the invention, that is, it swings between its pivot points 65 and 66 beyond dead center as the mirror panel 10a moves from the full to the dot-dash lines position illustrated in FIG. 5.

It will particularly be noted that the cross pin 56a is extended downwardly a substantially greater distance than the downward extension of the corresponding pin 56 in the form of the invention shown in FIGS. 1–4 and that it connects with a slide piece 68 which is provided for this purpose with a transverse groove 69 in its upper face in which the lower end of the cross pin 56a is positioned. The slide piece 68 is arranged to slide lengthwise parallel with the common core 34a in a slideway 70. This slideway is provided by a downward extension 71 of the case 20a and this downward extension has a bottom wall 72 provided with a slot 73 and a front wall 74, facing the driver, provided at its center with a window 75. The slide piece 68 is shown as provided at one end with the legend "Day" and which is arranged to come into register with the window 75 when the mirror panel is adjusted to the high intensity image reflection position shown by full lines in FIG. 5. The area surrounding this legend "Day" can also be roughened, as indicated at 76, or otherwise provided with a tactile surface different from the surface of a legend "Nite" at the opposite end of the slide piece 68. This legend "Nite" comes into register with the window 75 when the mirror panel 10a is in its position of low intensity reflection, this being the position indicated by the dot-dash line, FIG. 5. The slide piece 68 also has a downwardly extending finger piece 78 which projects through the slot 73.

It will be seen that moving the finger piece 78 manually to the left or right not only moves the cross pin 56a to adjust, through the cam slots 54a, 55a, the mirror panel to its high and low intensity reflective positions shown by full and dot-dash line positions, respectively, in FIG. 5 but also serves to bring the corresponding legend "Day" or "Nite" into view through the window 75. At the same time energization of either the solenoid 32a or 33a will do the same thing electrically, that is bring the mirror panel to high or low intensity reflective positions and also bring the corresponding legend "Day" or "Nite" into view through the window at 75.

From the foregoing it will be seen that the present invention has the advantages and accomplishes the various objectives previously set forth.

We claim:

A manually mechanically and manually electrically controlled multi-position rear vision mirror, comprising a panel having a reflective face, a case having its rim secured to and forming a bezel for said panel, said case enclosing the side of said panel in rear of its reflective face, a supporting plate arranged in said case and extending along said panel, means extending through an opening in said case for attaching said supporting plate to an automobile body, means pivotally supporting said case on said supporting plate to swing about a horizontal axis arranged generally parallel with said reflective face, solenoid means including at least one winding fast to said case on an axis generally parallel with and spaced from said first mentioned axis and said solenoid means also including at least one movable core, a rod fixed to and projecting axially from the core of said solenoid means, an extension fast to said supporting plate and extending alongside said rod and having a closed cam slot of predetermined length, a transversely projecting member on said rod and riding along said closed cam slot to translate longitudinal movement of said core and rod into movement of said panel between fixed points about said first axis, means providing a slideway in said case adjacent said transversely projecting member and extending lengthwise of said rod, a slider in said slideway and having a fingerpiece projecting outwardly from said case, and means operatively connecting said slider to said transversely projecting member.

References Cited in the file of this patent

UNITED STATES PATENTS

| | | |
|---|---|---|
| 1,887,706 | Bettman | Nov. 15, 1932 |
| 1,913,874 | Folberth et al. | June 13, 1933 |
| 2,718,175 | Gim | Sept. 20, 1955 |
| 2,806,408 | Moeller | Sept. 17, 1957 |
| 2,848,979 | Meade | June 17, 1958 |
| 2,843,017 | Ponce | July 15, 1958 |

FOREIGN PATENTS

| | | |
|---|---|---|
| 499,802 | Great Britain | Jan. 30, 1939 |
| 680,686 | Great Britain | Oct. 8, 1952 |
| 757,974 | Great Britain | Sept. 26, 1956 |
| 785,041 | Great Britain | Oct. 23, 1957 |